May 15, 1951 C. D. WESTOVER 2,552,828

RADIO TUNING DIAL

Filed Dec. 8, 1948 3 Sheets-Sheet 1

INVENTOR.
CHARLES D. WESTOVER
BY
Reynolds & Beach
ATTORNEYS

May 15, 1951 C. D. WESTOVER 2,552,828

RADIO TUNING DIAL

Filed Dec. 8, 1948 3 Sheets-Sheet 2

INVENTOR.
CHARLES D. WESTOVER
BY
Reynolds & Beach
ATTORNEYS

INVENTOR.
CHARLES D. WESTOVER
BY
Reynolds & Beach
ATTORNEYS

Patented May 15, 1951

2,552,828

UNITED STATES PATENT OFFICE 2,552,828

RADIO TUNING DIAL

Charles D. Westover, Seattle, Wash.

Application December 8, 1948, Serial No. 64,131

11 Claims. (Cl. 116—124.3)

The present invention relates to indicating means, and is particularly intended as a tuning dial for use in radio mechanism. Its principles will be recognized as peculiarly adapted to the latter use, wherein adjustment by minute increments throughout several turns of a control shaft may be desirable, and yet it is undesirable to compress the graduations of the scale into a single circle, but rather to lengthen out or expand the scale length so that as a whole its movement coincides with or, in some cases, is greater than that of the control shaft, whereby the changes are the more readily readable and correlated with the actual adjustment. At the same time, the principles illustrated will be appreciated as desirable in other uses, hence it is not intended to restrict the use to the particular and presently most obvious use indicated above.

As has been indicated, it is a primary object of the present invention to provide mechanism by which adjustments, such as tuning by small increments, may be accomplished, in correlation with which movements of index devices over a scale are at least as greatly spaced angularly, or are relatively magnified or spread out so that the minute adjustments become the more readily apparent and can be controlled the more closely.

Moreover, it is an object of this invention to provide mechanism generally described by the term "radio tuning dial" which is of compact form and simple construction.

It is also an object to provide a radio tuning dial in which the control knob is closely, conveniently and symmetrically, and hence conventionally, associated with a viewing window, but in which the parts themselves should be somewhat offset for the purpose of securing better registry between the cooperative parts of the indicating means.

A still further object is to provide a radio tuning dial in which the control shaft and knob may be directly aligned with the mechanism to be controlled and readily coupled thereto, and in which the indicating dials are mounted as a unit in the intervening space and surrounding the control shaft.

With these objects in mind, and others as will appear as this specification progresses, my invention comprises the novel radio tuning dial or indicating means which is shown in the accompanying drawings in a typical form, and as will be more fully disclosed and claimed hereinafter.

Figure 1:
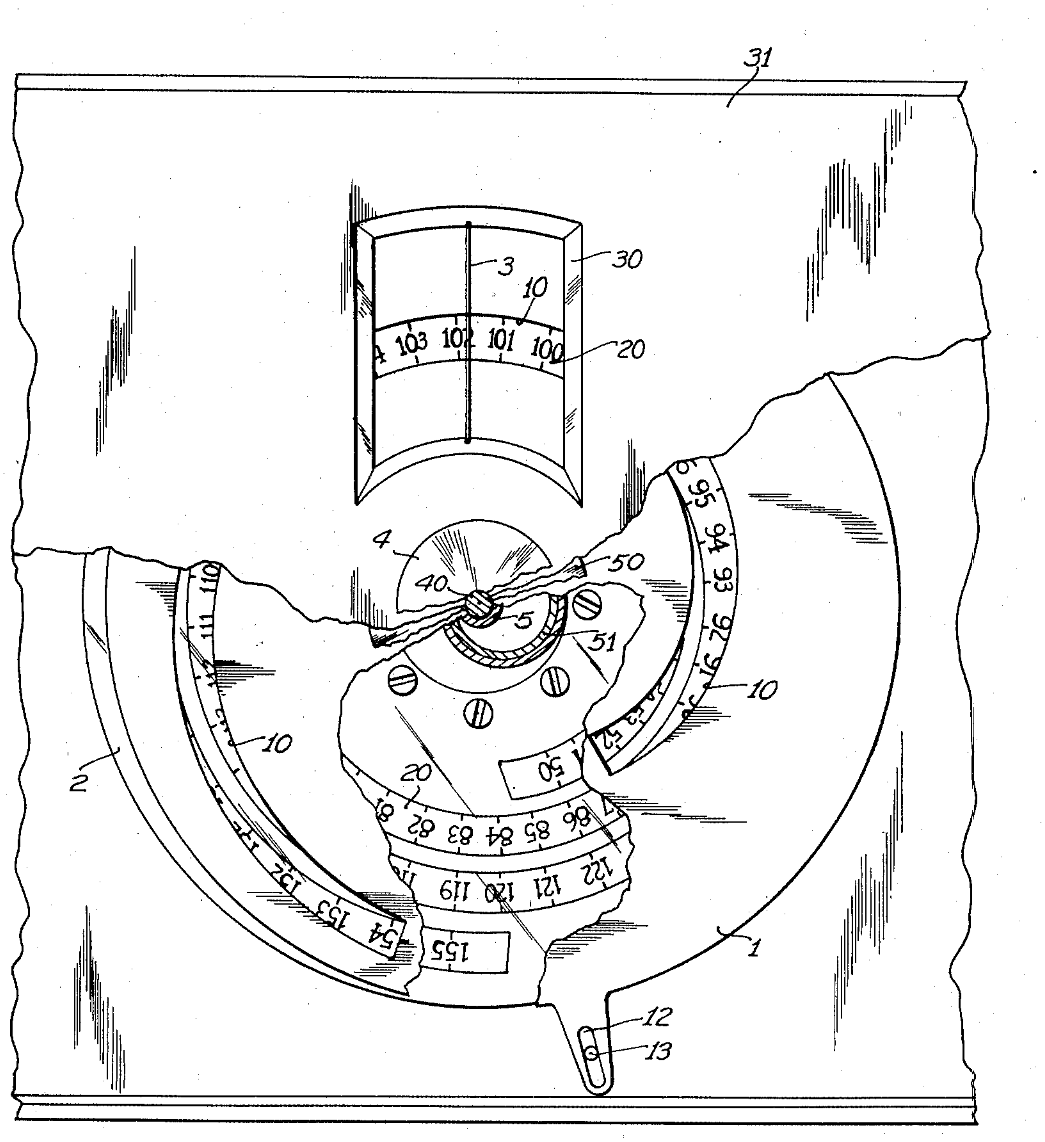
Figure 1 is a front elevational view with various parts broken away progressively to show the interior construction.

In essence, the invention resides in the relationship of a masking dial 1, a scale bearing dial 2, a viewing window 30 in a panel 31 within which window is an index wire or hair 3, a control shaft 40 journalled in the panel and bearing at its outer end a control knob 4, and at its inner end having a coupling 46 for connection to a tuning shaft T, and in the relationship between the axes of the dials 1 and 2 and the median line, in the general axial direction, of the window 30 as defined by the index 3.

The masking dial 1, which is nearer the window 30, is formed with a slot 10 which takes the form of a spiral, preferably a regular Archimedes' spiral. The radial and vectorial factors of this spiral are so chosen that in a single convolution, or something short of one convolution, it will increase by a given radial amount.

Figure 2:
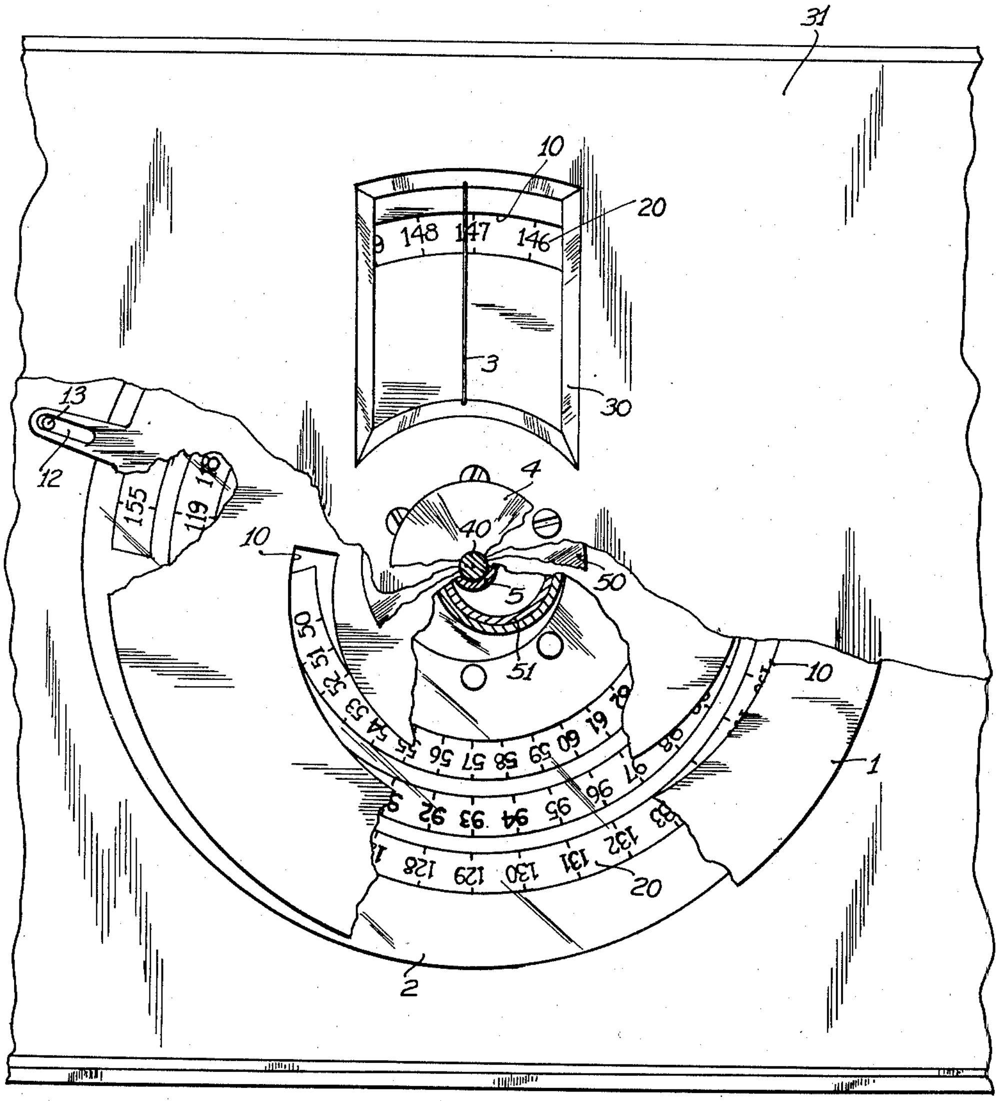
Figure 2 is a similar view with the parts in different relative positions of adjustment.
Figure 3:
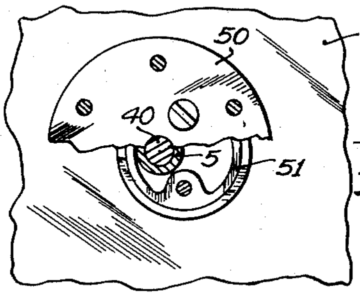
Figure 3 is a partly broken away view, illustrating a detail of the journal or mounting mechanism.

The dial 2, which is farther from the window 30, and which may be of translucent plastic material, bears a scale 20 which also is in the form of a spiral similar to the spiral slot 10, but having its radial and vectorial factors so chosen that in order to accomplish the same extent of radial increase, some larger number of convolutions are necessary. In the illustrated form approximately four convolutions of the spiral scale 20 are required to accomplish the same radial increase as the spiral slot 10 accomplishes in approximately one convolution. For equal radial vectors, therefore, the spiral 20 has a vectorial factor four times that of the spiral 10. The spiral 20 is made up of a series of scale graduations and figures to correspond thereto, as is best seen in Figures 1 and 2, and which may correspond to frequencies within the tuning range of the radio mechanism controlled by the shaft T.

The two dials, 1 and 2, are so located with respect to one another and with relation to the viewing window 30, that within the comparatively restricted width of the viewing window the spiral 10 will so closely coincide with some one convolution of the spiral 20, in every rotated position of the two dials, that no departure is perceptible to the eye, yet the visible portion of the scale is always oriented symmetrically transversely of the window, and is not slanted. By rotation of the two dials at differential rates of speed, one single convolution of the scale 20 at a time, and no more, will be viewed through the visible portion of the slot 10. As the dials rotate differentially, the visible portion of the slot 10 will, in effect, traverse the height of the window 30 and will move in a direction generally radially of the dial and of the shaft 40, but will always retain its symmetrical, non-slanted orientation. In order to accomplish this result, the dial 2 must rotate at a speed which is related to the rotative speed of the dial 1 in the same relation, but inversely, as their respective convolutions are related. In other words, if the radial vector of the spiral 20 is $n$ times that of the spiral 10, the dial 2 must rotate at $n$ times the vectorial rate of the dial 1, in order to maintain the desired registry between them at the window 30, and as they pass the index 3.

Figures 4, 5:
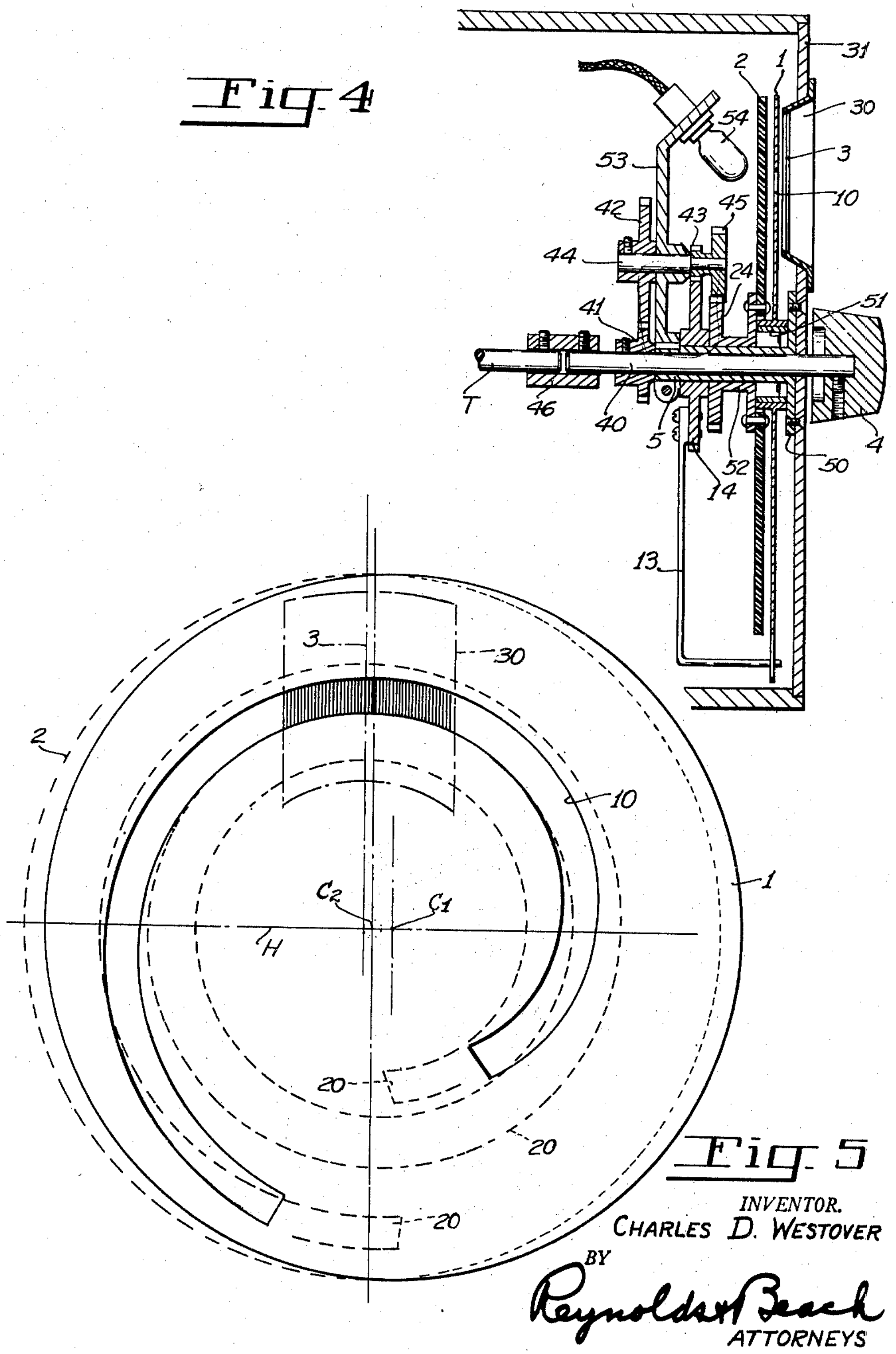
Figure 4 is a vertical axial sectional view through the radio tuning dial mounted in a cabinet.
Figure 5 is a diagrammatic view, in the nature of a front elevational view, to illustrate the relationship between the viewing window, the masking dial, and the scale-bearing dial.

While the result just indicated is capable of accomplishment by differential gearing, it has been discovered that it is not feasible, for best results, to mount the two dials 1 and 2 concentrically, nor to mount either of their axes in an extension of the median line of the window 30, represented by the index line 3. Instead, as is best shown in Figure 5, the dial 1 is mounted for rotation at a center C1, which is materially offset from the line 3, and the dial 2 is mounted for rotation at a point C2, which is offset to the same side of the line 3 as is the center C1, but by an appreciably lesser amount. The line H, which joins the centers C1 and C2, is normal to the index line 3. Only by this relationship is it possible to maintain the visible portion of the scale 20 in substantial coincidence, and non-slanted throughout the width of a window 30 (which may be an inch and a half wide) with the portion of the slot 10 which is visible through the same window, in all rotated positions of the dials. Thus, while it is not absolutely essential that this offset relationship of the centers be maintained, it affords the most convenient arrangement, and one which is least conducive to confusion in reading the dial.

There is a relationship between the offsets from the index line 3 of centers C1 and C2, and the radial vectors of the two spirals. I have found that the offset of center C1 is a constant times the radial vector for one complete revolution of the slot 10, and that the value of the constant is 0.155. But in the illustrated embodiment the dial 1 revolves less than one complete revolution, actually 0.85 revolution, which we may designate $\theta$, and in the illustrated case the dial 2 revolves 2.93 revolutions, which we may designate $\phi$. Now I have found that the offset of the dial 2 compares to the offset of dial 1 in the relationship of $\theta$ to $\phi$, or $$C2 \text{ offset} = C1 \text{ offset} \times \frac{\theta}{\phi}$$

By such formula, and the use of the constant given, the correct offsets for any relationship of the dials or their radius vector can be ascertained.

Mechanically, a sleeve 5, carried by a mounting flange 50 upon the inside of the panel 31, constitutes the journal for the control shaft 40, and a journal about which certain gears rotate. This sleeve 5 is eccentrically disposed within a bushing 51, which also is mounted upon the mounting flange 50, and this bushing 51 constitutes the journal about which the disk 1 rotates. A further sleeve 52, rotating about the sleeve 5, constitutes the support for dial 2. To the reduced inner end of the journal sleeve 5 is mounted an upstanding bracket 53, upon which a lamp 54 may be mounted to illuminate the dial 2 behind the slot 10 and window 30. This bracket 53 is held against rotation and serves as a support for a countershaft 44.

A gear 41, fast upon the inner end of the control shaft 40, drives a larger gear 42 upon the countershaft 44, and the countershaft carries a small pinion 43 and a larger pinion 45. The pinion 45 in turn meshes with a gear 24 upon the sleeve 52, which therefore effects revolution of the dial 2 at a rotational speed which bears a definite vectorial relationship to rotation of the control shaft 40.

The small pinion 43 meshes with a gear 14 journalled upon the sleeve 5, which bears a radially extending arm 13 that has a bent outer end to extend around the periphery of the dial 2 to reach the periphery of the dial 1, which it engages and rotates. The gear 14, however, is eccentric with relation to the axis of the dial 1, therefore, the connection of the bent end of the arm 13 with the dial 1 may not be direct but must have provision for relative radial movement, as well as conjoint rotative movement. A radially directed slot 12 in the peripheral portion of the disk 1 receiving the end of the arm 13 will serve this purpose. The dial 1 revolves at a rotational speed which bears a definite relation to the rotation of control shaft 40, hence to the rotation of dial 2. In the illustrated form this gearing effects the relationship of $\theta$ to $\phi$.

Tuning of the radio mechanism is effected by rotating the control knob 4 and thereby the control shaft 40 and its coupled tuning shaft T. At the same time, through the gear mechanism, the dial 2 rotates conjointly with the knob 4, but not at the same rate. The dial 2 must be rotated through several revolutions between its extreme limits, and in so doing so will accomplish a lesser number of revolutions of the dial 1. The latter will be rotated thus at a slower rate by the differential gear mechanism. It follows that as the spiral slot 10, in that portion which registers with the window 30, traverses in a general radial direction the height of the window 30, the spiral scale 20 will likewise traverse the height of the window, and at the same time apparent radial rate, though its angular rate is several times as great in the example chosen. In consequence, one single convolution only of the scale 20 will be visible through the spiral slot 10 and these two, the slot 10 and the scale 20, will remain in registry as they traverse the height of the window 30. The rotated position of the dial 2 will always be an index of the rotated position of the shaft 4 and the coupled shaft T. While the rotated position of the dial 1 will be $1/n$ times the revolutions of the dial 2, the final result will be that the scale is spread out to as fine a degree as necessary, and need not be compressed into the extent of a single revolution of the dial, and yet there is no possibility of mistaking which convolution is to be read, since only the one convolution which corresponds to the rotated position of the dials is visible through the spiral slot 10, and cooperates with the index hair 3. Neither is it necessary to tilt the head, or in effect to stand on one's head, in order to read the dial, for the visible portion of the scale is always symmetrically disposed, and not even slanted, at opposite sides of the index 3, and it is always in one customary position; never does the reading point shift or rotate.

I claim as my invention:

1. Indicating means comprising a first rotative dial bearing a spiral scale, a second rotative dial superimposed upon the first dial and having a spiral slot, the slot and scale substantially coinciding along a selected line which lies generally radially of the two dials, the rate of increase of radius vector of the slot spiral with change of vector angle being $n$ times greater than the corresponding rate of increase of the scale spiral radius vector, and means to rotate said dials differentially, the scale dial at a rate $n$ times faster than the slotted dial, whereby the point of coincidence shifts radially along the selected line, but not angularly as the scale rotates therepast.

2. Indicator means comprising, in combination, a viewing window, a dial rotatable past and visible through said window, bearing a graduated scale arranged in a spiral curve, a cooperating rotative masking dial interposed between the window and scale-bearing dial, having a slot extending along a spiral curve and arranged for registry at any one time long a selected line and to each side thereof, with a single convolution of the spiral scale at the window, the spiral curve of the slot having a greater rate of change in its radius vector for a given vectorial rotation, than that of the scale, and means to rotate said dials simultaneously and differentially in the same sense about non-coincident axes, each offset to the same side of such selected line, the ratio of the rotational rates of the dials being inversely equal to the ratio of the rates of change of their respective spiral curve radius vectors.

3. In combination with a rotative control knob, a viewing window of material height and restricted width, an upright index line centralized therein, two dials each mounted for rotation about axes generally in line with but each offset by a different amount laterally from said index line, and to the same side thereof, each such dial being located closely behind the window and in planes parallel thereto, the dial nearer the window having a spiral slot of a width which is a fraction of the window's height, and of radial and vectorial factors such as to traverse the window's height in $n$ revolutions of said control knob, the farther dial bearing a spirally arranged series of indicia of radial and vectorial factors such as to require a multiple of $n$ revolutions of such farther dial to traverse the window's height, means for operatively connecting said control knob to controlled devices, and means operatively connecting said control knob differentially to each of said dials, to rotate the two synchronously but at different rotative speeds, related correspondingly to the relationship of the factor $n$ by which the radial and vectorial factors of the nearer dial exceed those of the farther dial, to maintain the spiral indicia of the two dials in registry as they rotate and traverse the window.

4. The combination of claim 3, wherein the radial factor of the spiral element in the two dials is substantially identical, but the vectorial factor of the spiral indicia of the farther dial is a multiple of the vectorial factor of the slot in the nearer dial.

5. The combination of claim 4, wherein the vectorial extent of the spiral slot is in the vicinity of 360°, and the vectorial extent of the spiral indicia is approximately four times that extent.

6. The combination of claim 3, wherein the non-coincident and laterally offset axes of rotation of the two dials lie in a common line at right angles to the center line of the window, to maintain substantial coincidence and symmetry of such portion of the two spiral elements, at each side of the selected line, as is visible through the viewing window, in all rotated positions of the dials.

7. In combination with a panel having a viewing window of material height and restricted width, a control shaft journaled in said panel beneath and laterally offset from the center line of said window, interiorly adapted for operative connection to controlled devices, and exteriorly bearing a control knob, a nearer dial journaled behind said panel upon an axis which is further laterally offset, to the same side of the window's center line, and spirally slotted to expose an arcuate slot through and which extends transversely of and in non-slanted, symmetrical orientation relative to said window, which arcuate slot will in effect traverse the height of the window in the same orientation as the dial rotates, a farther dial journaled behind said nearer dial, concentrically of said shaft, and bearing spirally disposed indicia visible through and generally in registry with said arcuate slot, the vectorial and radial factors of the spiral indicia being so related to the like factors of the spiral slot and the offsets of the rotative axes of the two dials being so related, as to require a multiple of the vectorial rotation of the slotted disk to effect equal radial traverse of the two spiral elements, and mechanism interconnecting the shaft and each of the disks, to rotate them simultaneously but differentially in the ratio of such multiple.

8. The combination of claim 7, wherein the offset C1 of the axis of the near dial is a constant times the radial factor for a vectorial factor $\theta$, and the relationship of the several factors is represented by the formula $$C2 = C1 \times \frac{\theta}{\phi}$$

where C2 is the offset of the farther dial's axis, and $\theta$ is the vectorial factor of the farther dial's spiral indicia.

9. The combination of claim 8, including drive means interconnecting the control shaft and the concentrically journaled farther disk for rotation at a substantially equal angular rate, and further drive means interconnecting the control shaft and the eccentrically journaled slotted disk for rotation of the latter at an angular rate which is the selected multiple of the angular rate of said shaft.

10. The combination of claim 9, the drive means interconnecting the control shaft and the eccentrically journaled slotted disk comprising a speed-increasing gear train, an arm projecting from the final gear of such train, about the periphery of the farther disk, and connected by means engageable for rotative movement with, but for radial movement relative to, the slotted disk.

11. The combination of claim 8, including a journal sleeve supported from and interiorly of the panel and journaling the control shaft, a bracket mounted thereon, a countershaft journaled in said bracket, a gear train including gears carried by the control shaft, the countershaft, and said journal sleeve, operatively connected to rotate the farther dial at a rotative speed approximating that of the control shaft, and differential gear means upon the countershaft and said journal sleeve, and a radial arm operatively connected to rotate the slotted dial at a rotative speed materially slower, by the selected multiple, than the rotative speed of the farther dial.

CHARLES D. WESTOVER.

REFERENCES CITED

The following references are of record in the file of this patent:

UNITED STATES PATENTS

| Number | Name | Date |
|---|---|---|
| 2,009,449 | Hedley | July 30, 1935 |

FOREIGN PATENTS

| Number | Country | Date |
|---|---|---|
| 45,593 | France | Oct. 17, 1935 |